US011113641B1

(12) United States Patent
Schlechter et al.

(10) Patent No.: US 11,113,641 B1
(45) Date of Patent: Sep. 7, 2021

(54) SYSTEMS AND METHODS FOR ACCESS CONTROL GOVERNANCE RECOMMENDATION

(71) Applicant: FMR LLC, Boston, MA (US)

(72) Inventors: Eleanor Schlechter, Morrisville, NC (US); Apurva Jani, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/120,781

(22) Filed: Dec. 14, 2020

(51) Int. Cl.
*G06Q 10/06* (2012.01)

(52) U.S. Cl.
CPC ..... *G06Q 10/0631* (2013.01); *G06Q 10/06312* (2013.01)

(58) Field of Classification Search
CPC ...................................................... G06Q 10/06
See application file for complete search history.

(56) References Cited

U.S. PATENT DOCUMENTS

| 7,185,192 | B1* | 2/2007 | Kahn | G06F 21/6218 |
| | | | | 707/999.003 |
| 2005/0138061 | A1* | 6/2005 | Kuehr-McLaren | G06F 16/00 |
| 2008/0168063 | A1* | 7/2008 | Whitson | G06F 21/604 |
| 2015/0135305 | A1* | 5/2015 | Cabrera | H04L 63/102 |
| | | | | 726/17 |
| 2015/0341357 | A1* | 11/2015 | Rambur | H04L 63/10 |
| | | | | 726/3 |
| 2016/0057150 | A1* | 2/2016 | Choi | H04L 63/102 |
| | | | | 726/1 |
| 2019/0007415 | A1* | 1/2019 | Kliger | H04L 63/104 |
| 2019/0087781 | A1* | 3/2019 | Mercury | G06K 9/00302 |
| 2019/0251274 | A1* | 8/2019 | Wang | G06F 21/604 |
| 2020/0028877 | A1* | 1/2020 | Tiwari | G07C 9/27 |
| 2020/0074338 | A1* | 3/2020 | Florentino | G06N 7/005 |
| 2020/0285761 | A1* | 9/2020 | Buck | G06F 21/56 |
| 2021/0099541 | A1* | 4/2021 | Konstantopoulos | H04L 67/22 |

* cited by examiner

*Primary Examiner* — Kurtis Gills
(74) *Attorney, Agent, or Firm* — Proskauer Rose LLP

(57) ABSTRACT

A computer-implemented method is provided for generating an access profile for a given user in a group of users. The method includes generating (i) a demographic similarity matrix of demographic similarity scores, each score measuring a degree of similarity between a pair of the users with respect to a demographic metric in a plurality of demographic metrics, and (ii) an access similarity matrix of access similarity scores, each score measuring a degree of similarity between a pair of the users with respect to an entitlement in a plurality of entitlements. The method also includes calculating a group similarity matrix based on a weighted average of the demographic and access similarity matrices. The method further includes creating the access profile for the given user based on the group similarity matrix. The access profile indicates access recommendations for the given user in relation to the plurality of entitlements.

22 Claims, 5 Drawing Sheets

FIG. 7

SYSTEMS AND METHODS FOR ACCESS CONTROL GOVERNANCE RECOMMENDATION

TECHNICAL FIELD

This application relates generally to systems, methods and apparatuses, including computer program products, for generating a profile for a given user that controls/recommends the user's access to resources in an enterprise.

BACKGROUND

It is critical for a business organization to be able to manage employee access to various system resources, including ensuring each employee has a level of access that is appropriate to his/her job role. For example, as an employee moves within the organization on account of job changes or business reorganization, the employee can continue to accumulate access with each move, many of which may be obsolete or unnecessary to the employee's current job role. In today's market, there is a lack of tools available allowing an organization to automatically identify access that is either necessary or unnecessary for employees.

SUMMARY

The present invention features systems and methods for a recommendation engine configured to generate an access profile for a user of an enterprise. The recommendation engine generally allows a business organization to identify and/or revoke unnecessary access from employees, thereby allowing the organization to have better control and be more secure. The recommendation engine is also able to output a list of recommended access that the engine believes a given user should have within the user's access profile but does not currently possess. The recommendation engine can be applied in many situations ranging from generating an access profile in a "cold start" situation, in which the user does not currently hold any access entitlements, to updating a legacy access profile that has been carried over by a user from a previous position within the enterprise. In some embodiments, the recommendation engine uses a comprehensive approach for generating an access profile by taking into account of a number of data sources, including analysis related to the user's peer group, coupled with outlier detection results of each access entitlement population. In some embodiments, the peer group analysis involves determining the user's peers and generating weighted similarity scores based on both demographic details of the peers and currently-held access entitlements by the peers (when available).

In one aspect, a computer-implemented method is provided for generating an access profile for a given user in a group that includes a plurality of users. The method comprises generating, by a computing device, a demographic similarity matrix of demographic similarity scores. Each demographic similarity score measures a degree of similarity between a pair of the users in the group with respect to a demographic metric in a plurality of demographic metrics. The method also includes generating, by the computing device, an access similarity matrix of access similarity scores. Each access similarity score measures a degree of similarity between a pair of the users in the group with respect to an entitlement in a plurality of entitlements. Further, generating the access similarity matrix comprises generating a subject-access matrix that includes a plurality of access vectors corresponding to the plurality of users, where each access vector indicating current access privileges of the corresponding user with respect to the plurality of entitlements. The method also includes calculating, by the computing device, a group similarity matrix based on a weighted average of the demographic similarity matrix and the access similarity matrix. The method further includes performing, by the computing device, outlier detection on the group similarity matrix to (i) detect least one user who is an outlier associated with each entitlement and (ii) update the subject-access matrix to capture a reduction in the corresponding access privilege for the at least one outlier user with respect to the corresponding entitlement. The method additionally includes creating, by the computing device, the access profile for the given user based on the group similarity matrix and the updated subject-access matrix. The access profile indicates access recommendations for the given user in relation to the plurality of entitlements.

In another aspect, a computer-implemented system is provided for generating an access profile for a given user in a group that includes a plurality of users. The system comprises a peer analysis engine configured to generate a demographic similarity matrix of demographic similarity scores, where each demographic similarity score measures a degree of similarity between a pair of the users in the group with respect to a demographic metric in a plurality of demographic metrics. The peer analysis engine is also configured to generate an access similarity matrix of access similarity scores, where each access similarity score measures a degree of similarity between a pair of the users in the group with respect to an entitlement in a plurality of entitlements. Generating the access similarity matrix comprises generating a subject-access matrix that includes a plurality of access vectors corresponding to the plurality of users. Each access vector indicates current access privileges of the corresponding user with respect to the plurality of entitlements. The peer analysis engine is further configured to form a group similarity matrix based on a weighted average of the demographic similarity matrix and the access similarity matrix. The system also includes an outlier detection engine configured to perform outlier detection to (i) detect least one user who is an outlier associated with each entitlement and (ii) update the subject-access matrix to capture a reduction in the corresponding access privilege for the at least one outlier user with respect to the corresponding entitlement. The system further includes an application engine configured to create the access profile for the given user based on the group similarity matrix and the updated subject-access matrix. The access profile indicates access recommendations for the given user in relation to the plurality of entitlements.

Any of the above aspects can include one or more of the following features. In some embodiments, a clustering algorithm is applied on the group similarity matrix to detect the at least one user who is an outlier associated with each entitlement. In some embodiments, the clustering algorithm is a Hierarchical Density-Based Spatial Clustering of Applications with Noise (HDBSCAN) algorithm.

In some embodiments, creating the access profile further includes extracting from the group similarity matrix a vector associated with the given user. The vector comprises similarity scores capturing overall similarities between the given user and other users in the group. The extracted vector is filtered to remove similarity scores below a predetermine threshold. The filtered vector is then multiplied with the updated subject-access matrix to create a vector of confidence scores, where each confidence score measures a confidence in the given user to access an entitlement in the plurality of entitlements. In some embodiments, creating the access profile further includes recommending to continue allowing an existing access to an entitlement by the user if the corresponding confidence score in the vector of confidence scores is greater than or equal to a first threshold, or recommending to remove the existing access of the given user to an entitlement if the corresponding confidence score in the vector of confidence scores is less than the first threshold. In some embodiments, a new access to an entitlement is recommended for grant to the given user if the corresponding confidence score is greater than or equal to a second threshold, where the second threshold is higher than the first threshold. In some embodiments, an interactive user interface displays the access profile to the given user, including the recommendations for at least one of allowing existing access, removing existing access, or adding new access to an entitlement.

In some embodiments, the demographic similarity matrix is generated by creating for each user of the plurality of users a vector numerically identifying the user's satisfaction of the plurality of demographic metrics, assembling the vectors for the plurality of users into a subject-detail matrix, and multiplying the vectors in the subject-detail matrix on a pairwise basis using cosine similarity to generate the demographic similarity matrix. In some embodiments, the demographic metrics include business group associations, cost center associations and job function identification.

In some embodiments, the access similarity matrix is generated by assembling the access vectors to create the subject-access matrix and multiplying the vectors in the subject-access matrix on a pairwise basis using cosine similarity to generate the access similarity matrix. In some embodiments, the subject-access matrix is a binary matrix. In some embodiments, the subject-access matrix excludes a new user who does not have access to any one of the plurality of entitlements.

In some embodiments, calculating the group similarity matrix comprises assigning a higher weight to the demographic similarity matrix than to the access similarity matrix when computing the weighted average. In some embodiments, a weight assigned to the demographic similarity matrix is about 80% and a weight assigned to the access similarity matrix is about 20%.

In some embodiments, the calculation of the demographic similarity matrix, the access similarity matrix, the group similarity matrix and the outlier detection is scheduled on a periodic basis. The access profile for the given user can be created in substantially real-time in response to a user input.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 7 shows an exemplary interactive graphical user interface (GUI) for displaying a recommended access profile of a user, according to some embodiments of the present invention.

DETAILED DESCRIPTION

Figure 1:
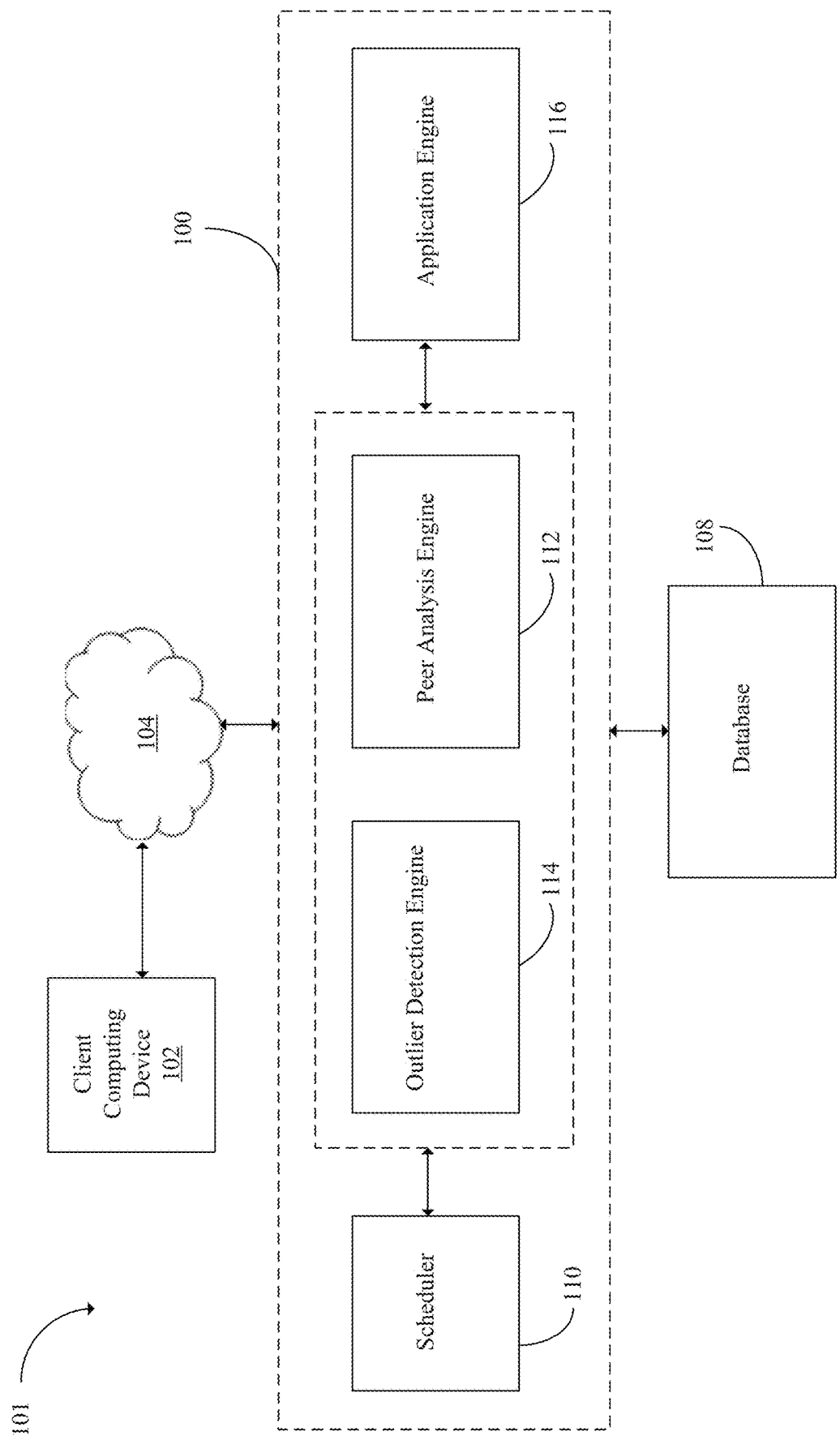
FIG. 1 shows an exemplary diagram of a recommendation engine used in a computing environment in which user access profiles are generated and displayed, according to some embodiments of the present invention.

FIG. 1 shows an exemplary diagram of a recommendation engine 100 used in a computing environment 101 in which user access profiles are generated and displayed, according to some embodiments of the present invention. As shown, the computing environment 101 generally includes a client computing device 102, a communication network 104, the recommendation engine 100 and a database 108.

The client computing device 102 connects to the communication network 104 to communicate with the recommendation engine 100 and/or the database 108 to provide inputs and receive outputs relating to the process of generating a recommended access profile for a user of the client computing device 102 as described herein. For example, the client computing device 102 can provide a detailed graphical user interface (GUI) that presents an access profile generated from the analysis methods and systems described herein, where the GUI can be utilized by the user to review and/or modify the recommended access profile. Exemplary client computing devices 102 include but are not limited to desktop computers, laptop computers, tablets, mobile devices, smartphones, and Internet appliances. It should be appreciated that other types of computing devices that are capable of connecting to the components of the computing environment 101 can be used without departing from the scope of invention. Although FIG. 1 depicts a single client device 102, it should be appreciated that the computing environment 101 can include any number of client devices.

The communication network 104 enables components of the computing environment 101 to communicate with each other to perform the process of access profile generation. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The recommendation engine 100 is a combination of hardware, including one or more processors and one or more physical memory modules and specialized software engines that execute on the processor of the recommendation engine 100, to receive data from other components of the computing environment 101, transmit data to other components of the computing environment 101, and perform functions as described herein. As shown, the processor of the recommendation engine 100 executes a scheduler module 110, a peer analysis engine 112, an outlier detection engine, 114, and an application engine 116, where the sub-components and functionalities of these components are described below in detail. In some embodiments, the components 110-116 of the recommendation engine 100 are specialized sets of computer software instructions programmed onto a dedicated processor in the recommendation engine 100 and can include specifically-designated memory locations and/or registers for executing the specialized computer software instructions.

The database 108 is a computing device (or in some embodiments, a set of computing devices) that is coupled to and in data communication with the recommendation engine 100 and is configured to provide, receive and store various types of data needed and created for generating user access profiles, as described below in detail. In some embodiments, all or a portion of the database 108 is integrated with the recommendation engine 100 or located on a separate computing device or devices. For example, the database 108 can comprise one or more databases, such as MySQL™ available from Oracle Corp. of Redwood City, Calif.

Figure 2:
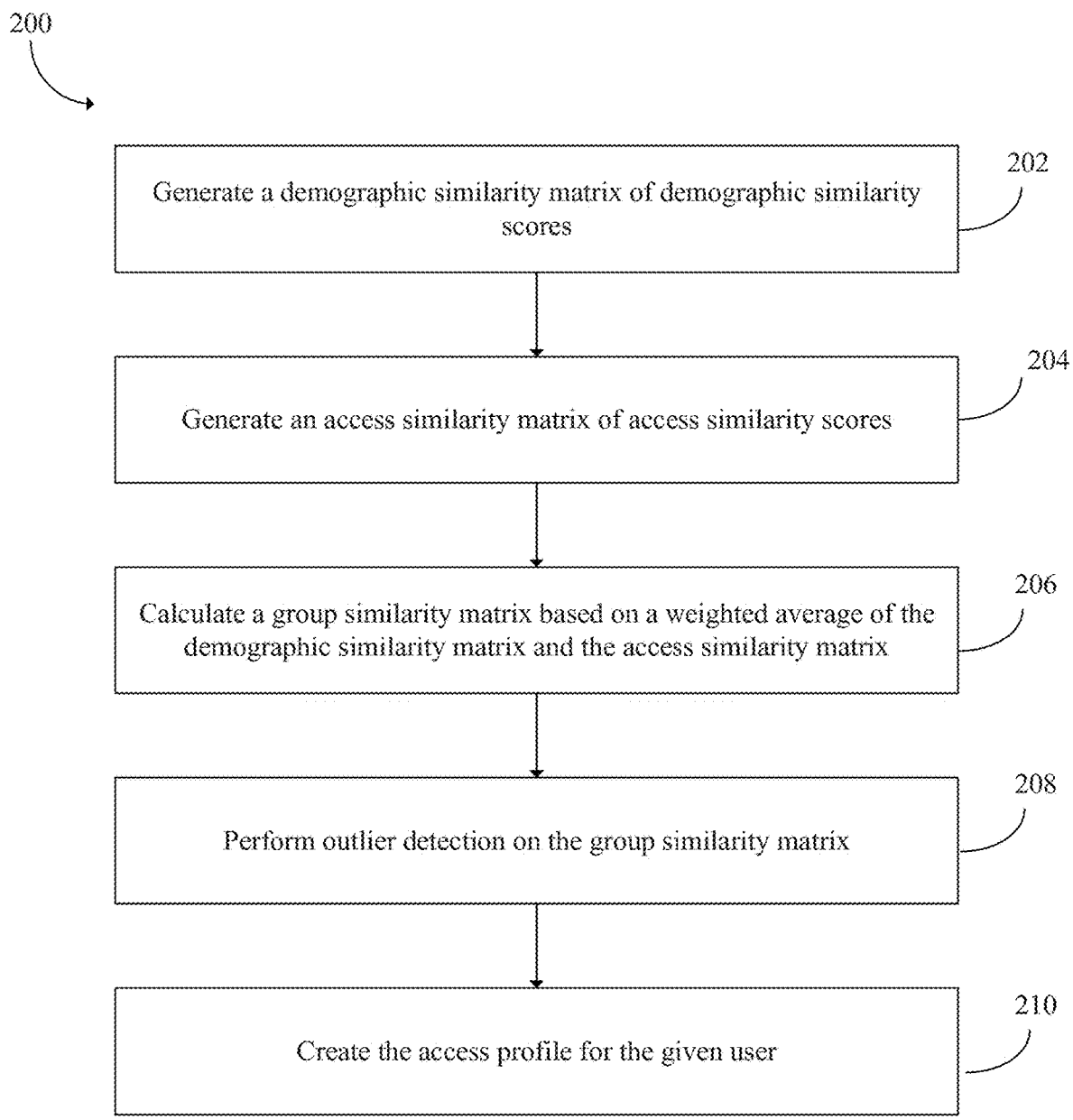
FIG. 2 shows a flow diagram of a computerized method for generating an access profile for a given user in a group of users utilizing the computing environment of FIG. 1, according to some embodiments of the present invention.

FIG. 2 shows a flow diagram of a computerized method 200 for generating a recommended access profile for a given user in a group of users utilizing the computing environment 101 and resources of FIG. 1, according to some embodiments of the present invention. In the context of the present invention, an access profile represents a collection of one or more access privileges (i.e., entitlements) recommended to a given user by the recommendation engine 100 with respect to various resources in an organization. Thus, an input to the recommendation engine 100 can be the identity of the user for which an access profile is needed, along with certain details useful for determining entitlements for the user, such as his/her role in the enterprise, group associations, etc. The user group based on which an access profile for a particular user is determined can encompass the entire business enterprise or one or more groups within the business enterprise. In general, the size and members of the user group based on which analysis of the recommendation engine 100 is conducted can be predefined by an operator of the recommendation engine 100.

In general, the recommendation engine 100 uses a least-privileged approach to resolve access control governance of resources by recommending an access profile for a given user. "Least privileged" is defined as providing no more authorizations to access resources than necessary to perform required functions. The recommendation engine 100 can utilizes a user-based collaborative filtering approach to find a peer group for the given user based on similarities of demographic details. In addition, when available, the recommendation engine 100 can utilize a content-based approach to find a peer group for the user that is based on similarities of access privileges. Further, the recommendation engine 100 can generate a binary access matrix created for the user's peer group including the user himself/herself using the two types of similarities described above. In some embodiments, the recommendation engine 100 further utilizes outlier detection techniques to find outlier users within one or more access entitlement populations and these findings are used to adjust the access matrix as appropriate. The recommendation engine 100 can take the results of the peer group analysis and outlier detection to calculate the user's access entitlements to various resources as well as confidence scores associated with the calculations. Further, the recommendation engine 100 can output the user's recommended access profile by displaying the recommended entitlements along with their associated confidence scores. In some embodiments, the recommendation engine 100 also suggests the appropriate actions for a user to take based on the access profile, such as removing, maintaining or adding one or more entitlements.

The method 200 starts when the peer analysis engine 112 of the recommendation engine 100 generating (i) a demographic similarity matrix of multiple demographic similarity scores (step 202) and (ii) an access similarity matrix of multiple access similarity scores (step 204). These matrices are generated by the peer analysis engine 112 for the purpose of determining a user's peer group, which comprises one or more other users in the overall user group who are deemed similar to the user with respect to certain demographic metrics and current entitlement status. For the demographic similarity matrix, each demographic similarity score measures a degree of similarity between a pair of the users in the user group population with respect to a particular demographic metric among a set of multiple demographic metrics selected for the analysis. For the access similarity matrix, each access similarity score measures a degree of similarity between a pair of the users in the user group population with respect to an entitlement in a set of multiple entitlements.

Figure 3:
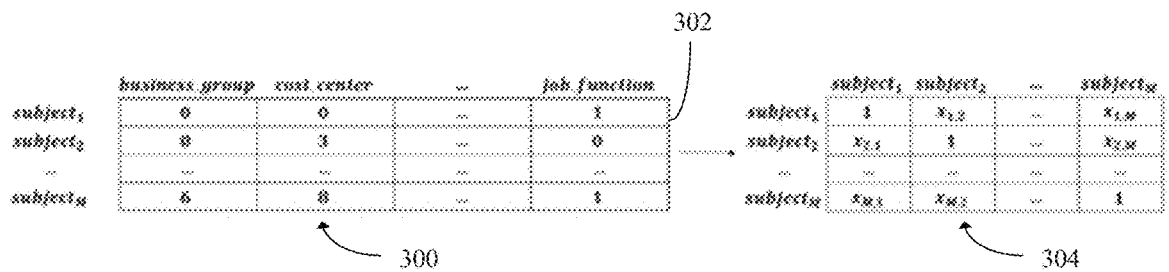
FIG. 3 shows exemplary subject-detail matrix and resulting demographic similarity matrix constructed by the peer analysis engine of the computing environment of FIG. 1, according to some embodiments of the present invention.

Specifically, to generate the demographic similarity matrix (step 202), the peer analysis engine 112 constructs a subject-detail matrix using the demographic details of each user in the user group in a user-based collaborative filtering technique. FIG. 3 shows an exemplary subject-detail matrix 300 and the resulting demographic similarity matrix 304 constructed by the peer analysis engine 112 of the computing environment 100 of FIG. 1, according to some embodiments of the present invention. As shown, the subject-detail matrix 300 is constructed to include multiple user vectors 302 corresponding to respective ones of the users in the user group. Each user vector 302 numerically identifies the corresponding user's affiliation with (i.e., satisfaction of) multiple demographic details, which can include, but are not limited to, business group associations, cost center associations, network domain associations, and job function identifications. For example, the rows of the subject-detail matrix 300 can correspond to the users of the user group, and the columns of the subject-detail matrix 300 can correspond to the multiple demographic metrics. However, a person of ordinary skill in the art understands that rows and columns of the subject-detail matrix 300 can be interchanged while still remaining within the scope of the present invention. In some embodiment, the subject-detail matrix 300 is a binary matrix consisting of 0's and 1's, where a user's satisfaction of a particular demographic metric is marked as a 1 and lack of satisfaction is marked as a 0. Once the subject-detail matrix 300 is complete, the peer analysis engine 112 is configured to multiply the user vectors 302 in the subject-detail matrix 300 on a pairwise basis using cosine similarity to generate the demographic similarity matrix 304. Thus, each numerical value in the demographic similarity matrix 304 represents a degree of similarity between a pair of the users in the user group with respect to the demographic details. In some embodiments, if there are M users in the user group and X demographic metrics, the subject-detail matrix 300 can have a size of M by X, and the demographic similarity matrix 304 can have a size of M by M.

Figure 4:
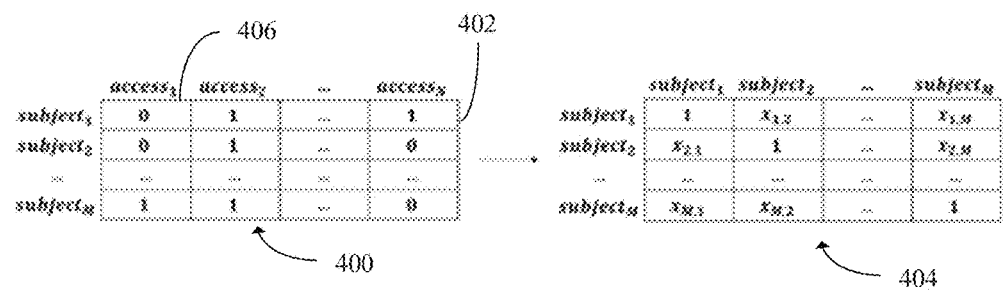
FIG. 4 shows exemplary subject-access matrix and resulting access similarity matrix constructed by the peer analysis engine of the computing environment of FIG. 1, according to some embodiments of the present invention.

To generate the access similarity matrix (step 204), the peer analysis engine 112 constructs a subject-access matrix using the current access profile of each user in the user group in a user-item content filtering technique. FIG. 4 shows an exemplary subject-access matrix 400 and the resulting access similarity matrix 404 constructed by the peer analysis engine 112 of the computing environment 100 of FIG. 1, according to some embodiments of the present invention.

Similar to the subject-detail matrix 300, the subject-access matrix 400 is built by the peer analysis engine 112 to numerically evaluate the relationship between the users with respect to available entitlements within the user group. As shown, the subject-access matrix 400 is constructed to include multiple access vectors 402 corresponding to respective ones of the users in the user group. Each access vector 402 numerically identifies the corresponding user's current entitlements to multiple resources. For example, the rows of the subject-access matrix 400 can correspond to the users of the user group, and the columns of the subject-access matrix 400 can correspond to the multiple entitlements. However, a person of ordinary skill in the art understands that rows and columns of the subject-access matrix 400 can be interchanged while still remaining within the scope of the present invention. In some embodiment, the subject-access matrix 400 is a binary matrix consisting of 0's and 1's, where a user's current assignment to a particular entitlement is marked as a 1 and lack of entitlement is marked as a 0. In some embodiments, in a cold start scenario where a user is new to the business enterprise and has little to no historical access data (e.g., has no current access privilege to any of the resources), the user's access vector 402 is configured to consist entirely of 0's. In this case, the new user is excluded from the subject-access matrix 400. In some embodiments, once the access-detail matrix 400 is complete, the peer analysis engine 112 is configured to multiply the access vectors 402 in the access-detail matrix 400 on a pairwise basis using cosine similarity to generate the access similarity matrix 404. Thus, each numerical value in the access similarity matrix 404 represents a degree of similarity between a pair of the users in the user group with respect to entitlements. In some embodiments, if there are M users in the user group and N demographic metrics, the access-detail matrix 400 can have a size of M by N, and the access similarity matrix 404 can have a size of M by M.

Referring back to method 200 of FIG. 2, the peer analysis engine 112 is configured to calculate a group similarity matrix based on a weighted average of the demographic similarity matrix 304 and the access similarity matrix 404 to generate a single similarity matrix that accounts for both demographic and entitlement similarities (step 206). Thus the resulting group similarity matrix can take into account the users' demographic details as well as their current access profiles (or use them as a "buying history" to train a model). In such a case, the peer analysis engine 112 gives more consideration toward legacy access and the probable event that a user has carried over access through different job roles. In some embodiments, the peer analysis engine 112 assigns a higher weight to the demographic similarity matrix 304 than to the access similarity matrix 404 when computing the weighted average. For example, the peer analysis engine 112 can assign a weight of about 80% to the demographic similarity matrix 304 and a weight of about 20% to the access similarity matrix 404. In some embodiments, if there are M users in the user group, the resulting group similarity matrix can has a size of M by M.

In some embodiments, the outlier detection engine 114 of the recommendation engine 100 can be configured to detect one or more outliers in the group similarity matrix (step 208). In general, an issue that can plague many business enterprises when dealing with access profiles is the concept of legacy access. This access can be defined as entitlements for a user that have been carried over time through one or more job roles of the user. However, instead of access being pruned on the event of a job change within the enterprise, the legacy access is carried over to the user's new role by default and the user is left on his/her own discretion to prune or not to prune. However, the user usually does not take the time to review and prune his or her own entitlements, thus carrying such legacy access onto the foreseeable future.

The outlier detection engine 114 can be configured to account for this data inaccuracy beyond the weighted group similarity matrix (generated at step 206). Specifically, the outlier detection engine 114 can leverage the subject access matrix 400 generated at step 204 along with the weighted group similarity matrix (generated at step 206) to perform the detection, where the subject access matrix 400 identifies which users belong to each entitlement population (e.g., from each column 406 of the subject access matrix 400 in FIG. 4). Then the outlier detection engine 114 uses the group similarity matrix (generated at step 206) to plot each user in an N-dimensional space. The subject vectors 406 of the subject access matrix 400, which are the columns of the subject access matrix 400 in FIG. 4, are used to select the users that will be taken into consideration for each access population. For example, if a user is flagged as "1", this means the user currently has the access and needs to be considered in the access population. Once the population is discovered, the associated rows from the weighted group matrix from step 206 are then supplied to a clustering algorithm, such as a Hierarchical Density-Based Spatial Clustering of Applications with Noise (HDBSCAN) algorithm, to determine which user(s) are outliers within an access population. Once an outlier in an entitlement population is detected, the outlier detection engine 114 is configured to update the subject-access matrix 400 to capture a reduction in the corresponding access privilege for each outlier user with respect to the corresponding entitlement, such as by reducing the numerical value from "1" to "0.5" or another smaller number.

Referring to step 210 of method 200 of FIG. 2, the application engine 116 of the recommendation engine 100 is configured to generate a personalized access profile recommendation for a given user based on the group similarity matrix (step 206) and the updated subject-access matrix from outlier detection (step 208). The user can make the request to the recommendation engine 100 to view his or her access profile via the client computing device 102. The access profile is configured to indicate access recommendations for the given user in relation to the multiple entitlements in the user group.

Figure 5:
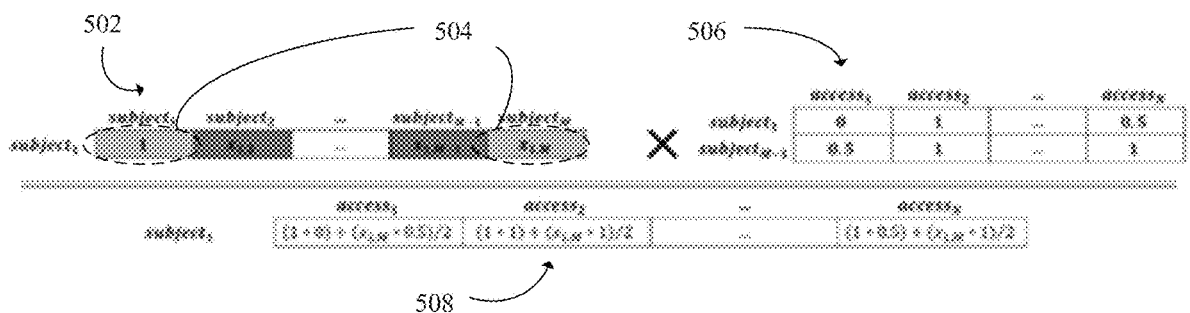
FIG. 5 shows exemplary intermediate matrices and vectors used by the application engine of the recommendation engine of the computing environment of FIG. 1 to create a personalize access profile for a given user, according to some embodiments of the present invention.

FIG. 5 shows exemplary intermediate matrices and vectors used by the application engine 116 of the recommendation engine of the computing environment of FIG. 1 to create a personalize access profile for a given user, according to some embodiments of the present invention. As shown, the application engine 116 can extract from the group similarity matrix (from step 206) a vector 502 associated with the given user (e.g., the row or column corresponding to the user from the group similarity matrix). The extracted vector 502 includes similarity scores capturing overall similarities between the given user and other users in the user group. In some embodiments, the application engine 116 filters the extracted vector to remove those similarity scores below a predetermined threshold in order to identify a peer group for the given user. For example, the predetermined threshold can be about 70%, such that a similarity score greater than or equal to 70% is needed to be considered similar. As shown in FIG. 5, the similarity scores 504 greater than or equal to 70%, which are the first and last elements of the vector 502, are highlighted in the extracted vector 502. Thus, the similarity scores that satisfy the threshold requirement can be used to identify users in the user group who are considered peers to the given user. Once the given user's peer group is selected, the application engine 116 can multiply the filtered vector 502 with the updated subject-access matrix 506 (generated from step 408) to create a vector 508 of confidence scores, where each confidence score measures a confidence in the given user to access each of the entitlements in the user group. Thus, the vector 508 of confidence scores represents an access profile for the given user. In some embodiments, if there are M users in the user group and N entitlements, the size of the filtered vector 502 can be 1 by M, the size of the updated subject-access matrix 506 can be M by N, and the resulting vector 508 of confidence scores can be 1 by N.

In some embodiments, the application engine 116 can make recommendations regarding entitlement access based on the access profile (i.e., the vector 508 of confidence scores). For example, the application engine 116 can recommend to continue allow an existing access to an entitlement by the user if the corresponding confidence score in the vector 508 of confidence scores is greater than or equal to a first threshold (e.g., 50%). The application engine 116 can recommend to remove an existing entitlement if the corresponding confidence score in the vector 508 of confidence scores is less than the first threshold (e.g., 50%). In some embodiments, the application engine 116 recommends granting a new access to an entitlement to the given user if the corresponding confidence score is greater than or equal to a second threshold (e.g., 70%). The second threshold can be higher than the first threshold.

Figure 6:
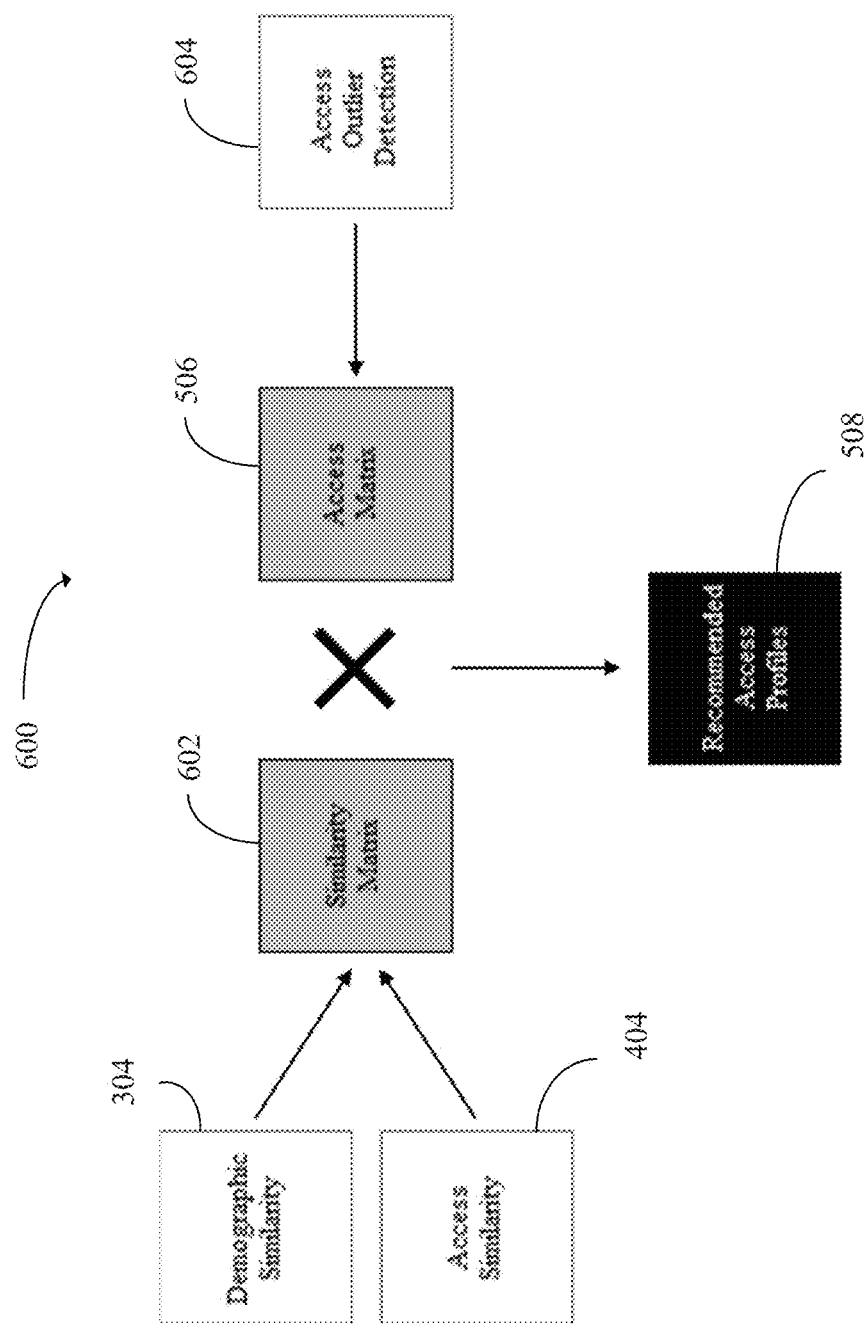
FIG. 6 shows an exemplary diagram graphically illustrating the various steps of the method of FIG. 2, according to some embodiments of the present invention.

FIG. 6 shows an exemplary diagram 600 graphically illustrating the various steps of the computerized method 200 of FIG. 2, according to some embodiments of the present invention. As shown, the demographic similarity matrix 304 (shown in FIG. 3) and access similarity matrix 404 (shown in FIG. 4) are first created at steps 202 and 204, respectively, of method 200. A group similarity matrix 602 is generated at step 206 of method 200 as a weighed combination of the demographic similarity matrix 304 and the access similarity matrix 404. Further, outlier detection is conducted at step 208 of method 200, the result of which 604 is used to update the subject-access matrix 400 created during step 204 to generate an updated subject-access matrix 506 (shown in FIG. 5). Thereafter, a filtered vector 502 from the group similarity matrix 602 that corresponds to a given user and the updated subject-access matrix 506 are multiplied at step 210 of method 200 to generate the vector 508 of confidence scores (shown in FIG. 5), which represents a given user's recommended access profile.

Referring back to FIG. 1, in some embodiments, the recommendation engine 100 includes the training scheduler engine 100 in electrical communication with both the outlier detection engine 114 and the peer analysis engine 112. The scheduler engine 100 is configured to schedule the calculation/update of the demographic similarity matrix, the access similarity matrix, the group similarity matrix and the outlier detections on a periodic basis. These calculations can be performed with or without any input from a user to capture any dynamic reassignments of roles and responsibilities within the business enterprise. In some embodiments, the application engine 116 can create an access profile for a given user in substantially real-time in response to a user request via the client computing device 102. The user request/input can be processed by an input engine (not shown) of the recommendation engine 100. The application engine 116 can create the access profile based on the various matrices and detections determined by the outlier detection engine 114 and the peer analysis engine 112. In some embodiments, the computations performed by the recommendation engine 100 are stored in the database 108, including the various matrices and outlier detections calculated and the access profiles created for different users of the business enterprise.

Figure 7:
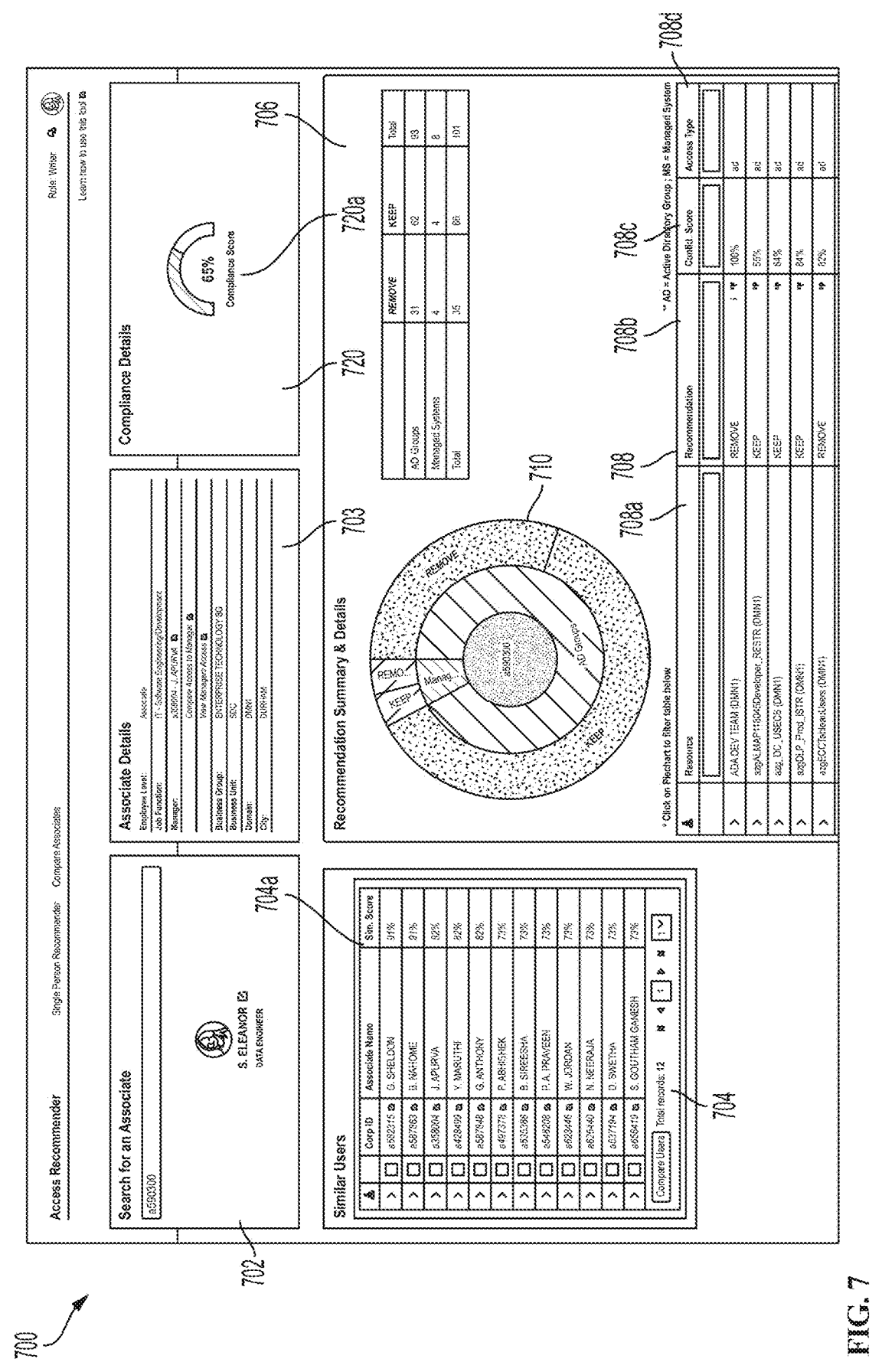

In some embodiments, the application engine 116 of the recommendation engine 100 is configured to provide an interactive graphical user interface to display the access profile of a given user. FIG. 7 shows an exemplary interactive graphical user interface (GUI) 700 for displaying a recommended access profile of a user, according to some embodiments of the present invention. As shown, the GUI 700 is divided into multiple regions, with a first region 702 displaying identification information associated with the user, including the user's name and job title within the business enterprise. Further, a second region 703 can be provided to display additional work-related data associated with the user. A third region 704 of the GUI 700 provides a list of peers to whom the recommendation engine 100 deems to be similar to the given user. Each peer can be associated with a similarity score 704a quantifying the similarity between the corresponding peer and the user. The list of peers and their similarity scores can be found in the extracted and filtered similarity vector 502 explained above with respect to FIG. 5.

The GUI 700 can further include a fourth region 706 displaying recommendations to the user for at least one of allowing existing access to one or more entitlements, removing existing access to one or more entitlements, and/or adding new access to one or more entitlements. The recommendations can be displayed in a tabular format 708 that provides in a first column 708a a list of entitlements/resources, a second column 708b a list of recommendations to keep, remove or add the corresponding entitlements, a third column 708c a list of confidence scores for the corresponding recommendations, and a forth column 708d a list of access types for the corresponding recommendations. Information used to populate this table 708 can be found in the vector 508 of confidence scores generated for the given user that is explained above with reference to FIG. 5. In some embodiments, the recommendations in table 708 is additionally displayed in an easy-to-visualize pie chart 710. In some embodiments, the user via the interactive GUI 700 can choose to accept or reject the recommendations. The user's response can be captured by the recommendation engine 100 to further train/fine tune its recommendations. In some embodiments, the GUI 700 includes a fifth region 720 displaying compliance details related to the user's access to various company resources. The compliance details can include a weighted health score 720a of the user's access profile, where the score 720a can be weighted by the corresponding risk of each individual entitlement assigned to the user (e.g., displayed in column 708a of table 708). Further, the health score 720a can be negatively affected if an entitlement has been flagged to be removed (e.g., displayed in column 708b of table 708).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal MOBILE Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for generating an access profile for a given user in a group that includes a plurality of users with respect to access of a plurality of resources, the method comprising:
   generating, by a computing device, a plurality of demographic similarity scores in a demographic similarity matrix, wherein each demographic similarity score measures a degree of similarity between a pair of the users in the group with respect to a demographic metric in a plurality of demographic metrics;
   generating, by the computing device, a plurality of access similarity scores in an access similarity matrix, wherein each access similarity score measures a degree of similarity between a pair of the users in the group with respect to a plurality of current access privileges to respective ones of the plurality of resources, wherein generating the plurality of access similarity scores comprises generating a subject-access matrix that includes a plurality of access vectors corresponding to the plurality of users, each access vector indicating the current access privileges of the corresponding user;
   calculating, by the computing device, a plurality of group similarity scores in a group similarity matrix based on a weighted average of the demographic similarity scores and the access similarity scores, wherein each group similarity score measures a degree of similarity between a pair of the users in the group with respect to both the demographic metrics and the current access privileges;
   performing, by the computing device, outlier detection on the plurality of group similarity scores to detect at least one user who is an outlier for accessing one or more of the resources;
   reducing, by the computing device based on the outlier detection, the current access privilege of the outlier user corresponding to the one or more resources, thereby accounting for legacy access of the outlier user to the one or more resources, wherein the reducing comprises numerically updating the access vector in the subject-access matrix that corresponds to the outlier user;
   creating, by the computing device, the access profile for the given user based on the group similarity matrix and the updated subject-access matrix, the access profile indicating access recommendations for the given user in relation to the resources; and
   granting, by the computing device, the given user access to the plurality of resources based on the access recommendations in the access profile.

2. The computer-implemented method of claim 1, wherein detecting the at least one user who is an outlier associated with each resource comprises applying a clustering algorithm on the group similarity matrix.

3. The method of claim 2, wherein the clustering algorithm is a Hierarchical Density-Based Spatial Clustering of Applications with Noise (HDBSCAN) algorithm.

4. The method of claim 1, wherein creating the access profile for the given user comprises:
   extracting from the group similarity matrix a vector associated with the given user, the vector comprising similarity scores capturing overall similarities between the given user and other users in the group;
   filtering the extracted vector to remove similarity scores below a predetermine threshold; and
   multiplying the filtered vector with the updated subject-access matrix to create a vector of confidence scores, each confidence score measuring a confidence in the given user to access a resource in the plurality of resources.

5. The method of claim 4, further comprising:
   recommending to continue allow an existing access to a resource by the user if the corresponding confidence score in the vector of confidence scores is greater than or equal to a first threshold; and
   recommending to remove the existing access of the given user to a resource if the corresponding confidence score in the vector of confidence scores is less than the first threshold.

6. The method of claim 4, further comprising recommending to grant a new access to a resource to the given user if the corresponding confidence score is greater than or equal to a second threshold, wherein the second threshold is higher than the first threshold.

7. The method of claim 6, further comprising displaying in an interactive user interface the access profile to the given user, including the recommendations for at least one of allowing existing access, removing existing access, or adding new access to a resource.

8. The method of claim 1, wherein generating the demographic similarity matrix comprises:
   creating for each user of the plurality of users a vector numerically identifying the user's satisfaction of the plurality of demographic metrics;
   assembling the vectors for the plurality of users into a subject-detail matrix; and
   multiplying the vectors in the subject-detail matrix on a pairwise basis using cosine similarity to generate the demographic similarity matrix.

9. The method of claim 8, wherein the demographic metrics include business group associations, cost center associations and job function identification.

10. The method of claim 1, wherein generating the access similarity matrix comprises:
    assembling the access vectors to create the subject-access matrix; and
    multiplying the vectors in the subject-access matrix on a pairwise basis using cosine similarity to generate the access similarity matrix.

11. The method of claim 1, wherein the subject-access matrix is a binary matrix.

12. The method of claim 1, further comprising excluding from the subject-access matrix a new user who does not have access to any one of the plurality of resources.

13. The method of claim 1, wherein calculating the group similarity matrix comprises assigning a higher weight to the demographic similarity matrix than to the access similarity matrix when computing the weighted average.

14. The method of claim 13, wherein a weight assigned to the demographic similarity matrix is about 80% and a weight assigned to the access similarity matrix is about 20%.

15. The method of claim 1, further comprising:
    scheduling the calculation of the demographic similarity matrix, the access similarity matrix, the group similarity matrix and the outlier detection on a periodic basis, and creating the access profile for the given user in substantially real-time in response to a user input.

16. A computer-implemented system for generating an access profile for a given user in a group that includes a plurality of users with respect to access of a plurality of resources, the system comprising:
a peer analysis engine configured to:
generate a plurality of demographic similarity scores in a demographic similarity matrix, wherein each demographic similarity score measures a degree of similarity between a pair of the users in the group with respect to a demographic metric in a plurality of demographic metrics;
generate a plurality of access similarity scores in an access similarity matrix, wherein each access similarity score measures a degree of similarity between a pair of the users in the group with respect to a plurality of current access privileges to respective ones of the plurality of resources, wherein generating the plurality of access similarity scores comprising generating a subject-access matrix that includes a plurality of access vectors corresponding to the plurality of users, each access vector indicating the current access privileges of the corresponding user; and
generate a plurality of group similarity scores in a group similarity matrix based on a weighted average of the demographic similarity scores and the access similarity scores, wherein each group similarity score measures a degree of similarity between a pair of the users in the group with respect to both the demographic metrics and the current access privileges;
an outlier detection engine configured to perform outlier detection on the plurality of group similarity scores to detect at least one user who is an outlier for accessing one or more of the resources, the outlier detection engine is adapted to reduce, based on the outlier detection, the current access privilege of the detected outlier user for accessing the one or more resources; and
an application engine configured to create the access profile for the given user based on the group similarity matrix and the updated subject-access matrix, the access profile indicating access recommendations for the given user in relation to the plurality of entitlements, the application engine adapted to grant the given user access to the plurality of resources based on the access recommendations in the access profile.

17. The computer-implemented system of claim 16, wherein the application engine is configured to create the access profile for the given user by:
extracting from the group similarity matrix a vector associated with the given user, the vector comprising similarity scores capturing overall similarities between the given user and other users in the group;
filtering the extracted vector to remove similarity scores below a predetermine threshold; and
multiplying the filtered vector with the updated subject-access matrix to create a vector of confidence scores, each confidence score measuring a confidence in the given user to access a resource in the plurality of resources.

18. The computer-implemented system of claim 16, wherein the peer analysis engine is configured to generate the demographic similarity matrix by:
creating for each user of the plurality of users a vector numerically identifying the user's satisfaction of the plurality of demographic metrics;
assembling the vectors for the plurality of users into a subject-detail matrix; and
multiplying the vectors in the subject-detail matrix on a pairwise basis using cosine similarity to generate the demographic similarity matrix.

19. The computer-implemented system of claim 16, wherein the peer analysis engine is configured to generate the access similarity matrix by:
assembling the access vectors to create the subject-access matrix; and
multiplying the vectors in the subject-access matrix on a pairwise basis using cosine similarity to generate the access similarity matrix.

20. The computer-implemented system of claim 16, further comprising a graphical user interface configured to display the access profile of the given user, including display at least one of:
(i) a recommendation to continue allow an existing access to an entitlement by the given user if the corresponding confidence score in the vector of confidence scores is greater than or equal to a first threshold,
(ii) a recommendation to remove the existing access of the given user to a resource if the corresponding confidence score in the vector of confidence scores is less than the first threshold, or
(iii) a recommendation to grant a new access to a resource to the given user if the corresponding confidence score is greater than or equal to a second threshold.

21. The computer-implemented system of claim 20, further comprising an input engine configured to receive an input from the given user to display the access profile via the graphical user interface, wherein the application engine is further configured to create and display the access profile for the given user in substantially real-time in response to the user input.

22. The computer-implemented system of claim 16, further comprising a training scheduler configured to schedule the calculation of the demographic similarity matrix, the access similarity matrix and the group similarity matrix by the peer analysis engine and the outlier detection by the outlier detection engine on a periodic basis.

\* \* \* \* \*